United States Patent [19]

Liesenborghs

[11] 4,024,770

[45] May 24, 1977

[54] SEALED JOINT

[76] Inventor: Roland Liesenborghs, Avenue du Hetre, 22, B.4200 Sclessin, Belgium

[22] Filed: May 12, 1975

[21] Appl. No.: 576,749

[30] Foreign Application Priority Data

May 10, 1974 Belgium .................................. 44576
Jan. 9, 1975 Belgium .................................. 44888

[52] U.S. Cl. .................................. 74/18.2; 92/98 D
[51] Int. Cl.² .................................. F16J 15/52
[58] Field of Search .................... 74/18, 18.1, 18.2; 92/98 D; 277/34, 34.3, 34.6, 59, 205

[56] References Cited

UNITED STATES PATENTS

| 2,692,618 | 10/1954 | Ludowici | 92/98 D |
|---|---|---|---|
| 2,725,078 | 11/1955 | Glancy | 92/98 D |
| 2,757,542 | 8/1956 | Klinger | 74/18.2 |
| 2,846,983 | 8/1958 | Otto | 92/98 D |
| 2,928,351 | 3/1960 | Klinger | 74/18.2 |
| 3,012,546 | 12/1961 | Heintzmann et al. | 92/98 D |
| 3,060,754 | 10/1962 | Klinger | 74/18.2 |
| 3,373,694 | 3/1968 | Taplin | 92/98 D |
| 3,416,819 | 12/1968 | Day | 74/18.2 |
| 3,435,733 | 4/1969 | Enke | 74/18.2 |
| 3,673,927 | 7/1972 | Fluhr | 92/98 D |

FOREIGN PATENTS OR APPLICATIONS 1,396,864  6/1975  United Kingdom ............... 92/98 D Primary Examiner—Carlton R. Croyle
Assistant Examiner—Edward Look
Attorney, Agent, or Firm—Young & Thompson

[57] ABSTRACT

A sealed joint between concentric inner and outer cylindrical members comprises an annular sleeve of flexible fluid impervious material of U-shaped cross section having the end of one leg secured to the inner surface of the outer cylindrical member and the end of the other leg secured to the outer surface of the inner cylindrical member. The sleeve can be a double sleeve, of closed configuration. The ends of the double sleeve can be spaced apart, or secured together, or integral. A fluid under pressure can be introduced into the confines of the double sleeve.

3 Claims, 9 Drawing Figures

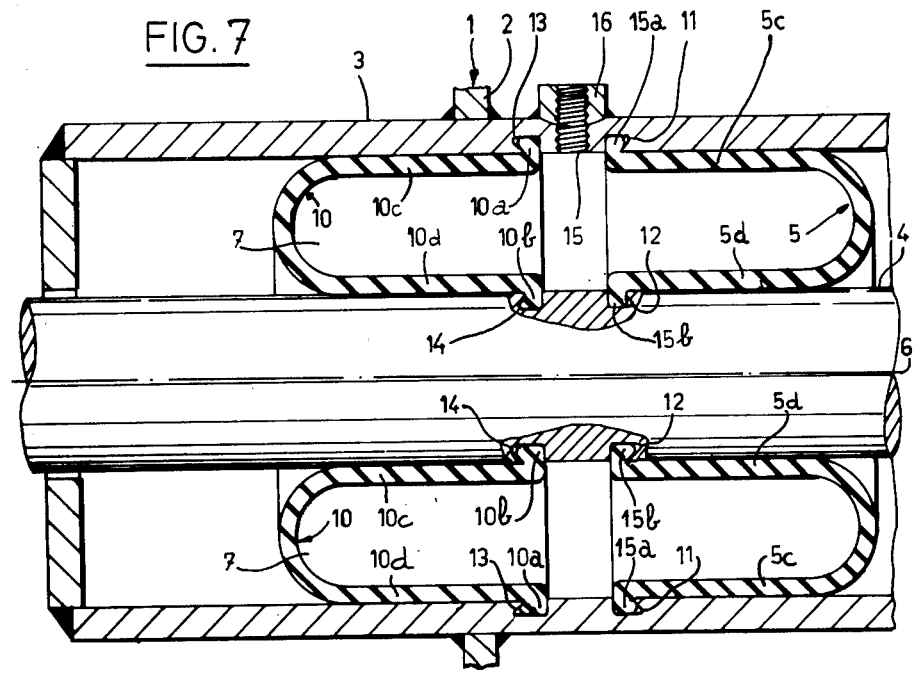
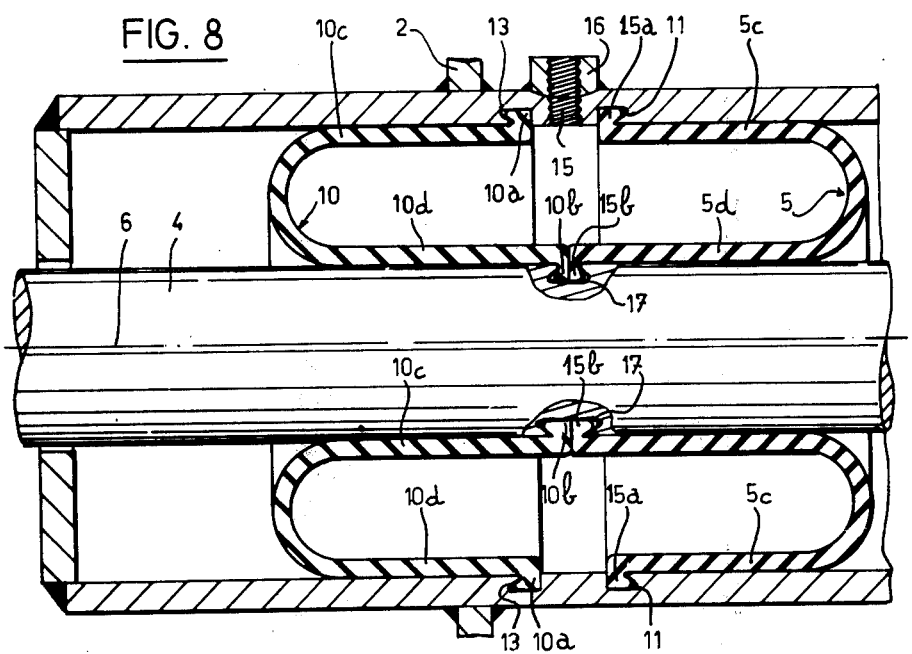

SEALED JOINT

The present invention relates to a flexible sealed joint between two relatively movable concentric cylindrical members.

In practice, it is often required that an element be displaceable relative to another element with reciprocating rectilinear movement, as in the case of a rod that reciprocates in an opening through the wall of a sealed chamber, for example in pneumatic, hydraulic or steam cylinders, in which a piston rod traverses a wall at one end of a cylinder. In such cases, it is known to provide the opening for passage of the rod, with a scraping joint or a packing which exerts on the rod a frictional force whose magnitude varies as the pressure within the cylinder. Such joints are undesirable in that they are pressure-responsive and are subject to scoring and to score the movable member, with resulting loss of fluidtightness. Moreover, if such joints are not to exert excessive frictional forces, the joint should have some play, which also reduces fluidtightness.

In certain relatively low pressure environments, it is possible to use a bellows seal which is fixed in fluidtight relationship at one edge to one element and at the other edge to the other element. Such seals are completely fluidtight and largely friction free; however, they are cumbersome and fragile because they split rapidly at the folds of the bellows and permit only a limited amplitude of relative movement, the displacement between the two extreme positions being relatively small.

Accordingly, it is an object of the present invention to provide a flexible joint between two elements that have relative reciprocal movement, which joint will offer complete fluidtightness without substantial friction and without substantial wear and which will permit the relative movement between the two parts to be relatively great.

Another object of the present invention is the provision of such a joint, which will be relatively simple and inexpensive to manufacture, easy to install, maintain and repair, and rugged and durable in use.

Briefly, the objects of the present invention are achieved by providing a sealed flexible joint characterized in that it is constituted by an annulus of flexible, elastic fluid-impervious material, whose axial cross section is U-shaped and whose axis is coincident with the axes of the relatively movable members, the ends of the legs of the U being fixed in fluidtight manner one to each of the confronting faces of the relatively movable members.

According to one embodiment of the invention, two such annuli are provided, opening toward each other, to form a single annular chamber. This chamber may be filled with a fluid under pressure.

Such a joint can thus provide complete fluidtightness between a movable element such as an axially reciprocating shaft that moves in the opening of a fixed guideway carried by a fixed closed chamber.

According to another embodiment of the invention, the U-shaped annuli are provided each with outwardly projecting flanges on the outer surfaces of both of their legs, these flanges being disposed in corresponding hollow grooves in the two interconnected elements. The outer of the two elements may have a connection for filling the internal annulus with a fluid under pressure.

According to another embodiment, the flanges are continuous one about each leg of the U-shaped cross section.

The flanges lodge in grooves which may be separated or not. These grooves may be of trapezoidal cross-sectional configuration. The flanges may be in contact with each other, spaced from each other, or integral with each other.

Other objects, features and advantages of the present invention will become apparent from a consideration of the following description, taken in connection with the accompanying drawings, in which:

FIG. 7 is a somewhat enlarged cross-sectional view of a third embodiment of the invention;

FIG. 8 is a view similar to FIG. 7 but showing a fourth embodiment; and

Figure 1:
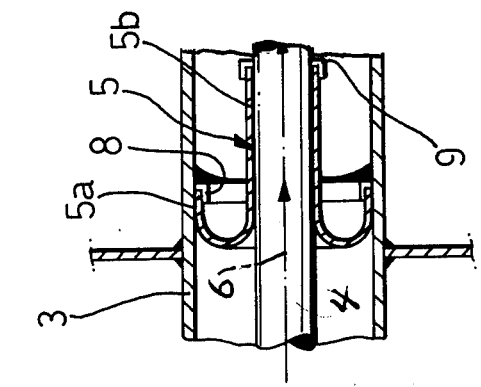
FIGS. 1–3 are cross-sectional views of a first embodiment of the present invention, in three different positions thereof.

Referring now to the drawings in greater detail, there is shown a seal according to the present invention, embodied in a fixed closed chamber 1 having one of its walls 2 provided with a cylindrical socket 3 welded thereto and providing an opening therethrough. A shaft 4 is reciprocable with rectilinear movement in socket 3, the axes 6 of socket 3 and shaft 4 being coincident.

A seal comprises an annular sleeve 5 of flexible elastic fluidtight material, e.g. rubber, having a U-shaped cross section that opens outwardly of chamber 1 and that is coaxial with the other parts. Sleeve 5 has an outer edge 5a secured in fluidtight relationship to socket 3 and an inner edge 5b secured in fluidtight relationship to shaft 4. Collar 8 secures the outer edge to socket 3; while a band 9 secures inner edge 5b to shaft 4 in fluidtight relationship.

Figure 2:
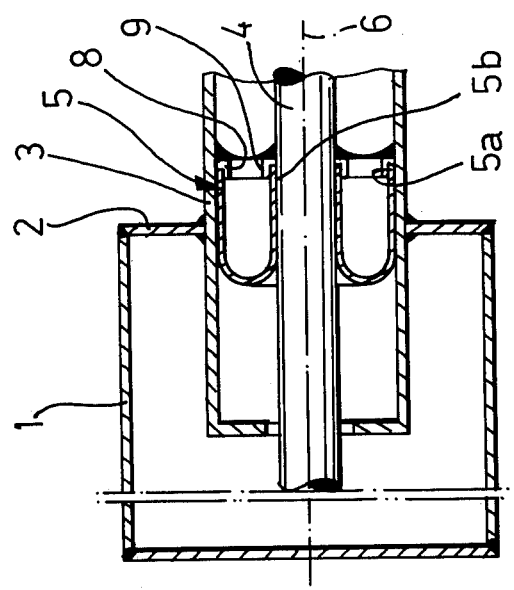
Figure 3:
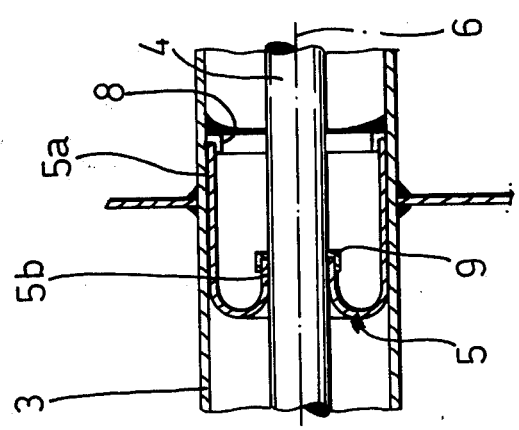

The legs of the U-shaped cross section of sleeve 5 can be of any length desired, according to the amplitude of relative movement of the parts 3 and 4. It will be noted from FIG. 2 that, in the median position of the parts, the two legs of the U-shaped sleeve are applied one against the outer member and the other against the inner member, which promotes fluidtightness.

Figure 6:
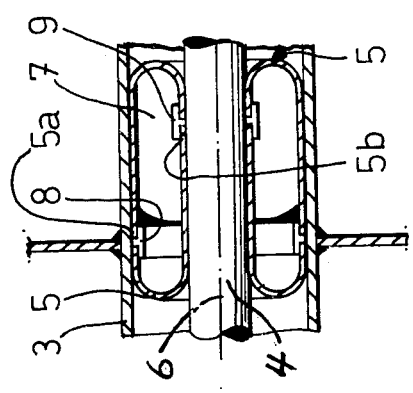
FIGS. 4–6 are views similar to FIGS. 1–3 but showing a second embodiment of the invention.
Figure 5:
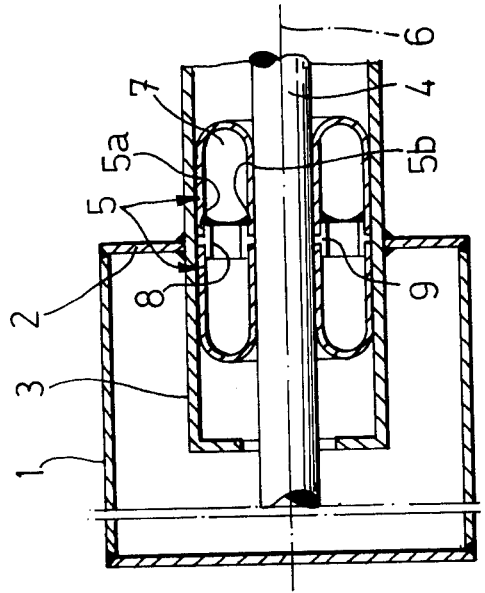
Figure 4:
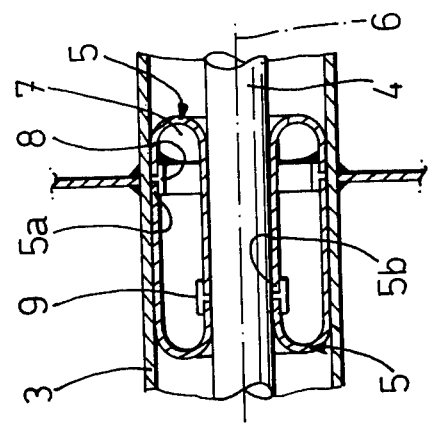

In the embodiment of FIGS. 4–6, there are two sleeves 5 that open toward each other and that are secured as before to the outer and inner members 3 and 4, respectively, by annular retainers 8 and 9, whereby the two sleeves form a fluidtight chamber 7 therebetween that has movement relative to both of the members 3 and 4 in the manner which is apparent by comparison of FIGS. 4–6 with each other.

In the embodiment of FIG. 7, two sleeves 5 and 10 are provided, which is the same general arrangement as in FIGS. 4–6. However, the sleeve 5 is provided along the edges of its legs 5c, 5d with two outwardly extending flanges 15a and 15b, respectively, which are continuous and annular and are disposed in correspondingly shaped trapezoidal grooves 11 and 12, respectively, in the socket 3 and shaft 4, respectively.

In the same manner, the sleeve 10 has two outstanding flanges 10a and 10b that project outwardly from the corresponding legs 10c and 10d, respectively, these flanges being lodged in trapezoidal grooves 13 and 14 in the socket 3 and shaft 4, respectively. Flange 15a on outer leg 5c, flange 15b on inner leg 5d, flange 10a on outer leg 10c and flange 10b on inner leg 10d are received separately each in its corresponding groove. Between the flanges 15a and 10a there is an opening 15 defined by a screw-threaded socket 16 which permits introducing a fluid under pressure in chamber 7. In this manner, under the influence of the pressure of the fluid in the chamber, the flanges are pressed into their respective groove and the legs of the sleeves are applied radially against the internal face of socket 3 and against the external face of shaft 4, thereby to augment fluidtightness.

The embodiment of FIG. 8 is like that of FIG. 7, except that in this case, the flanges 15b, 10b are in contact with each other and are clasped one against the other and are disposed in a single trapezoidal groove 17 provided in the shaft 4.

Figure 9:
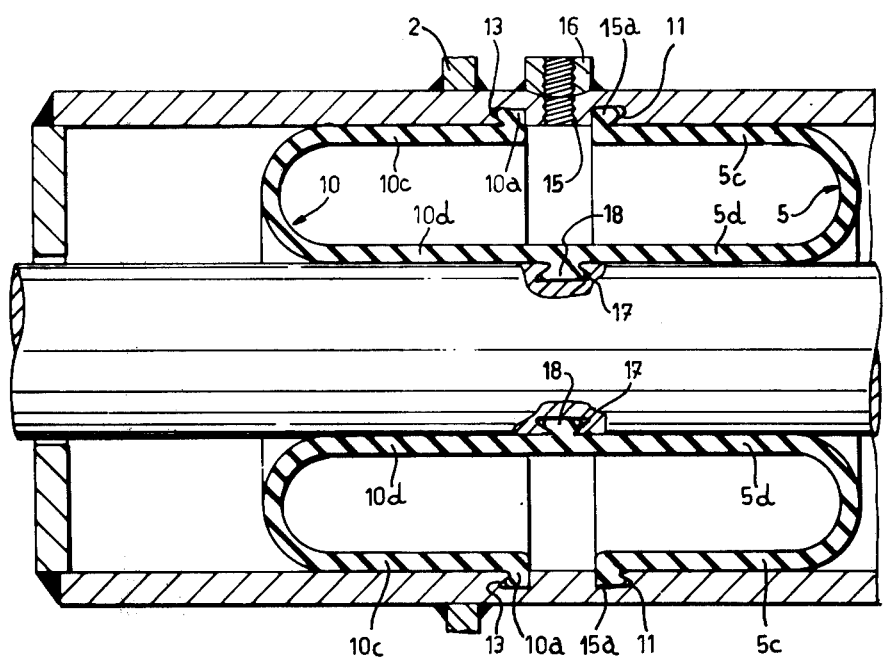
FIG. 9 is a view similar to FIGS. 7 and 8 but showing a fifth embodiment of the invention.

The embodiment of FIG. 9 is like that of FIG. 8, except that the inner legs 5d and 10d of the sleeves 5 and 10 are secured to each other in integral fashion so as to comprise a single wall on whose outer face is located a single flange 18 disposed in a single trapezoidal groove 17 in the shaft 4.

In the two embodiments of FIGS. 8 and 9, the external flanges 15a and 10a are, as in the embodiment of FIG. 7, disposed in grooves 11 and 13 provided in the socket 3. Fluid may be introduced under pressure through the opening 15 of the socket 16, which can have a closure plug having a check valve therein (not shown) or such a closure plug connected permanently to a source of fluid under pressure, thereby to prevent the loss of pressure in the chamber defined between the two sleeves.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. For example, instead of the shaft being movable and the socket fixed, the socket can be movable and the shaft fixed. These and other modifications and variations are considered to be within the purview and scope of the present invention as defined by the appended claims.

What is claimed is:

1. A fluidtight flexible seal for sealing inner and outer cylindrical members to each other for movement of the inner member relative to the unmovable outer member, said seal comprising:
    a first annular sleeve of U-shaped cross-sectional configuration and of flexible fluidtight material,
    an outer annular flange projecting outwardly from the outer leg of said first annular sleeve,
    an inner annular flange projecting inwardly from the inner leg of said first annular sleeve,
    a second annular sleeve of U-shaped cross-sectional configuration and of flexible fluidtight material, said second annular sleeve being arranged oppositely to the first sleeve and the sleeves opening toward each other,
    an outer annular flange projecting outwardly from the outer leg of said second annular sleeve,
    an inner annular flange projecting inwardly from the inner leg of said second annular sleeve,
    annular groove means in the outer face of said movable inner member, wherein said both inner flanges of said sleeves are secured in fluidtight relationsip to said inner member,
    a first annular groove in the inner face of said unmovable outer member, wherein said outer flange of said first sleeve is secured in fluidtight relationship to said outer member,
    a second annular groove in said inner face of said unmovable outer member, wherein said outer flange of said second sleeve is secured in fluidtight relationship to said outer member, said second groove being axially spaced from the first groove, whereby a closed annular chamber is defined by said sleeves and at least said outer member,
    means defining an opening through said outer member between said both outer flanges of said sleeves,
    and a socket mounted on said outer member about said opening for introducing fluid under pressure into said annular chamber.

2. A fluidtight flexible seal as claimed in claim 1, wherein both inner flanges and legs of said annular sleeves are integral with one another, whilst said inner flanges are secured in said annular groove in the outer face of said inner member in fluidtight relationship.

3. A fluidtight seal as claimed in claim 1, said socket being internally screw threaded.

* * * * *